United States Patent
Karp et al.

(10) Patent No.: US 12,206,631 B2
(45) Date of Patent: *Jan. 21, 2025

(54) SYSTEMS AND METHODS FOR CONTROLLING SECURE PERSISTENT ELECTRONIC COMMUNICATION ACCOUNT SERVICING WITH AN INTELLIGENT ASSISTANT

(71) Applicant: Capital One Services, LLC, McLean, VA (US)

(72) Inventors: Scott Karp, McLean, VA (US); Srinaath Thyagarajan, McKinney, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,495

(22) Filed: Oct. 11, 2023

(65) Prior Publication Data

US 2024/0039875 A1  Feb. 1, 2024

Related U.S. Application Data

(63) Continuation of application No. 18/058,943, filed on Nov. 28, 2022, now Pat. No. 11,818,083, which is a (Continued)

(51) Int. Cl.
*H04W 4/00* (2018.01)
*G06F 16/9032* (2019.01)
(Continued)

(52) U.S. Cl.
CPC ........ *H04L 51/02* (2013.01); *G06F 16/90332* (2019.01); *G06F 40/295* (2020.01);
(Continued)

(58) Field of Classification Search
CPC ... H04L 51/02; H04L 67/306; G06F 17/2785; G06F 17/30976; H04M 15/755
(Continued)

(56) References Cited

U.S. PATENT DOCUMENTS 9,565,305 B2 *  2/2017  Chakravarthy ....... H04W 4/021
10,044,647 B1 *  8/2018  Karp ...................... H04W 4/14
(Continued)

*Primary Examiner* — Amancio Gonzalez
(74) *Attorney, Agent, or Firm* — TROUTMAN PEPPER HAMILTON SANDERS LLP; Christopher J. Forstner; John A. Morrissett

(57) ABSTRACT

The disclosed technology includes systems and methods for controlling enrollment and secure persistent SMS texting account servicing communications. A method is provided that includes receiving, at an enrollment web portal, enrollment data including: enrollment credentials identifying a user for authentication, a phone number of a mobile device associated with the user, and consent by the user to persistently interact with an account servicing system via SMS texting. The method includes: processing the received enrollment data, authenticating the user responsive to processing the received enrollment data, storing the phone number of the mobile device associated with the user in a phone number data storage, and generating, responsive to the authenticating, a revocable token for persistent access to a natural dialogue module via a SMS texting gateway for the mobile device identified by the phone number.

20 Claims, 5 Drawing Sheets

Related U.S. Application Data continuation of application No. 17/231,029, filed on Apr. 15, 2021, now Pat. No. 11,588,761, which is a continuation of application No. 17/030,002, filed on Sep. 23, 2020, now Pat. No. 10,986,047, which is a continuation of application No. 16/740,678, filed on Jan. 13, 2020, now Pat. No. 10,791,068, which is a continuation of application No. 16/516,862, filed on Jul. 19, 2019, now Pat. No. 10,536,403, which is a continuation of application No. 16/281,720, filed on Feb. 21, 2019, now Pat. No. 10,374,983, which is a continuation of application No. 16/026,198, filed on Jul. 3, 2018, now Pat. No. 10,257,124, which is a continuation of application No. 15/916,521, filed on Mar. 9, 2018, now Pat. No. 10,044,647.

(51) Int. Cl.
*G06F 40/295* (2020.01)
*G06F 40/30* (2020.01)
*G06F 40/35* (2020.01)
*H04L 51/02* (2022.01)
*H04L 67/306* (2022.01)
*H04M 15/00* (2006.01)
*H04W 4/14* (2009.01)
*H04W 4/24* (2018.01)

(52) U.S. Cl.
CPC ............ *G06F 40/30* (2020.01); *G06F 40/35* (2020.01); *H04L 67/306* (2013.01); *H04M 15/755* (2013.01); *H04M 15/8221* (2013.01); *H04W 4/14* (2013.01); *H04W 4/24* (2013.01)

(58) Field of Classification Search
USPC .......................................................... 455/466
See application file for complete search history.

(56) References Cited

U.S. PATENT DOCUMENTS

| | | | | |
|---|---|---|---|---|
| 10,148,601 | B1* | 12/2018 | Dodelin | H04L 67/306 |
| 10,200,314 | B1* | 2/2019 | Karp | G06F 16/90332 |
| 10,257,124 | B1* | 4/2019 | Karp | G06F 40/30 |
| 10,374,983 | B1* | 8/2019 | Karp | H04L 67/306 |
| 10,404,630 | B1* | 9/2019 | Dodelin | H04L 63/1483 |
| 10,536,403 | B2* | 1/2020 | Karp | H04W 4/14 |
| 10,680,979 | B2* | 6/2020 | Karp | H04L 51/02 |
| 10,791,068 | B2* | 9/2020 | Karp | H04L 67/306 |
| 10,986,047 | B2* | 4/2021 | Karp | H04M 15/755 |
| 11,032,218 | B2* | 6/2021 | Dodelin | G06F 40/20 |
| 11,588,761 | B2* | 2/2023 | Karp | G06F 40/30 |
| 2010/0002685 | A1* | 1/2010 | Shaham | H04M 3/002 |
| | | | | 715/733 |
| 2010/0151889 | A1* | 6/2010 | Chen | H04M 3/493 |
| | | | | 704/E11.001 |
| 2013/0260739 | A1* | 10/2013 | Saino | H04L 67/10 |
| | | | | 455/419 |
| 2014/0280633 | A1* | 9/2014 | Ravindran | H04L 51/066 |
| | | | | 709/206 |
| 2015/0099550 | A1* | 4/2015 | Alharayeri | H04W 76/00 |
| | | | | 455/456.3 |
| 2015/0221007 | A1* | 8/2015 | Peter | H04L 67/142 |
| | | | | 709/229 |
| 2016/0294952 | A1* | 10/2016 | Bodell | H04L 51/046 |
| 2019/0342235 | A1* | 11/2019 | Karp | G06F 16/90332 |
| 2019/0379615 | A1* | 12/2019 | Karp | H04L 51/02 |
| 2019/0386938 | A1* | 12/2019 | Dodelin | H04L 51/046 |
| 2020/0153761 | A1* | 5/2020 | Karp | G06F 40/295 |
| 2020/0267100 | A1* | 8/2020 | Karp | H04L 51/02 |
| 2021/0006518 | A1* | 1/2021 | Karp | H04M 15/755 |
| 2021/0234815 | A1* | 7/2021 | Karp | H04M 15/8221 |
| 2021/0367910 | A1* | 11/2021 | Dodelin | H04L 63/1433 |

\* cited by examiner

SYSTEMS AND METHODS FOR CONTROLLING SECURE PERSISTENT ELECTRONIC COMMUNICATION ACCOUNT SERVICING WITH AN INTELLIGENT ASSISTANT

CROSS REFERENCE TO RELATED APPLICATION

This application is a continuation application under 35 U.S.C. § 120 of U.S. patent application Ser. No. 18/058,943, filed 28 Nov. 2022, which is a continuation of U.S. patent application Ser. No. 17/231,029, filed 15 Apr. 2021, which issued as U.S. Pat. No. 11,588,761 on 21 Feb. 2023, which is a continuation of U.S. patent application Ser. No. 17/030,002, filed 23 Sep. 2020, which issued as U.S. Pat. No. 10,986,047 on 20 Apr. 2021, which is a continuation of U.S. patent application Ser. No. 16/740,678, filed 13 Jan. 2020, which issued as U.S. Pat. No. 10,791,068 on 29 Sep. 2020, which is a continuation of U.S. patent application Ser. No. 16/516,862, filed 19 Jul. 2019, which is a continuation of U.S. patent application Ser. No. 16/281,720, filed 21 Feb. 2019, which issued as U.S. Pat. No. 10,374,983 on 6 Aug. 2019, which is a continuation of U.S. patent application Ser. No. 16/026,198, filed 3 Jul. 2018, and issued as U.S. Pat. No. 10,257,124 on 9 Apr. 2019, which is a continuation of U.S. patent application Ser. No. 15/916,521, filed 9 Mar. 2018 and issued as U.S. Pat. No. 10,044,647 on 7 Aug. 2018, the contents of which are hereby incorporated by reference in their entirety as if fully set forth herein. This application is also related to U.S. Pat. No. 10,200,314, which issued 5 Feb. 2019.

FIELD OF INVENTION

The present disclosure relates to systems and methods for providing account servicing with an intelligent assistant via SMS texting and, more particularly, to controlling enrollment and account servicing access using persistent authorization across multiple SMS communication sessions.

BACKGROUND

Organizations that offer products and/or services associated with customer accounts have traditionally relied on customer service representatives to interact with customers for account servicing. Call centers staffed with human representatives can provide certain advantages, particularly for customers who wish to speak to a human. However, such staffing can be cost-prohibitive. To reduce cost and increase account servicing efficiency, many organizations use interactive voice response (IVR) systems or programs that generate automatic written, auditory, or video responses via web and/or mobile device application channels. Such systems can provide customers with requested information and perform routine account actions without having to maintain a large workforce of customer service agents. While cost effective, existing computerized customer interaction systems tend to provide an impersonal and robotic user experience, limited by scripted questions and responses, and can require a cumbersome authorization process for each customer-service session.

Accordingly, there is a need for improved systems and methods to provide efficient and cost-effective customer interaction systems for account servicing. Embodiments of the present disclosure are directed to this and other considerations.

SUMMARY

Disclosed embodiments provide systems and methods for controlling enrollment and secure persistent SMS texting account servicing communications. A system is provided that includes one or more processors in communication with: an enrollment web portal, a natural language dialogue module, a SMS texting gateway, a phone number data storage, and a token storage. The system includes memory in communication with the one or more processors and storing instructions that, when executed by the one or more processors, are configured to cause the system to receive, at the enrollment web portal, enrollment data. The enrollment data includes: enrollment credentials identifying a user for authentication, a phone number of a mobile device associated with the user, and consent by the user to persistently interact with the system via SMS. The one or more processors of the system are further configured to authenticate the user responsive to processing the received enrollment data, store, in the phone number data storage, the phone number, and generate, responsive to the authentication, a revocable token for persistent access to the natural dialogue module via the SMS texting gateway for a mobile device identified by the phone number. The one or more processors are further configured to initiate, responsive to the authentication, a persistent SMS texting session with the mobile device identified by the phone number.

Consistent with the disclosed embodiments, methods for controlling enrollment and secure persistent SMS texting account servicing communications are also disclosed. Further features of the disclosed design, and the advantages offered thereby, are explained in greater detail hereinafter with reference to specific embodiments illustrated in the accompanying drawings, wherein like elements are indicated with like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology.

DETAILED DESCRIPTION

Figure 1:
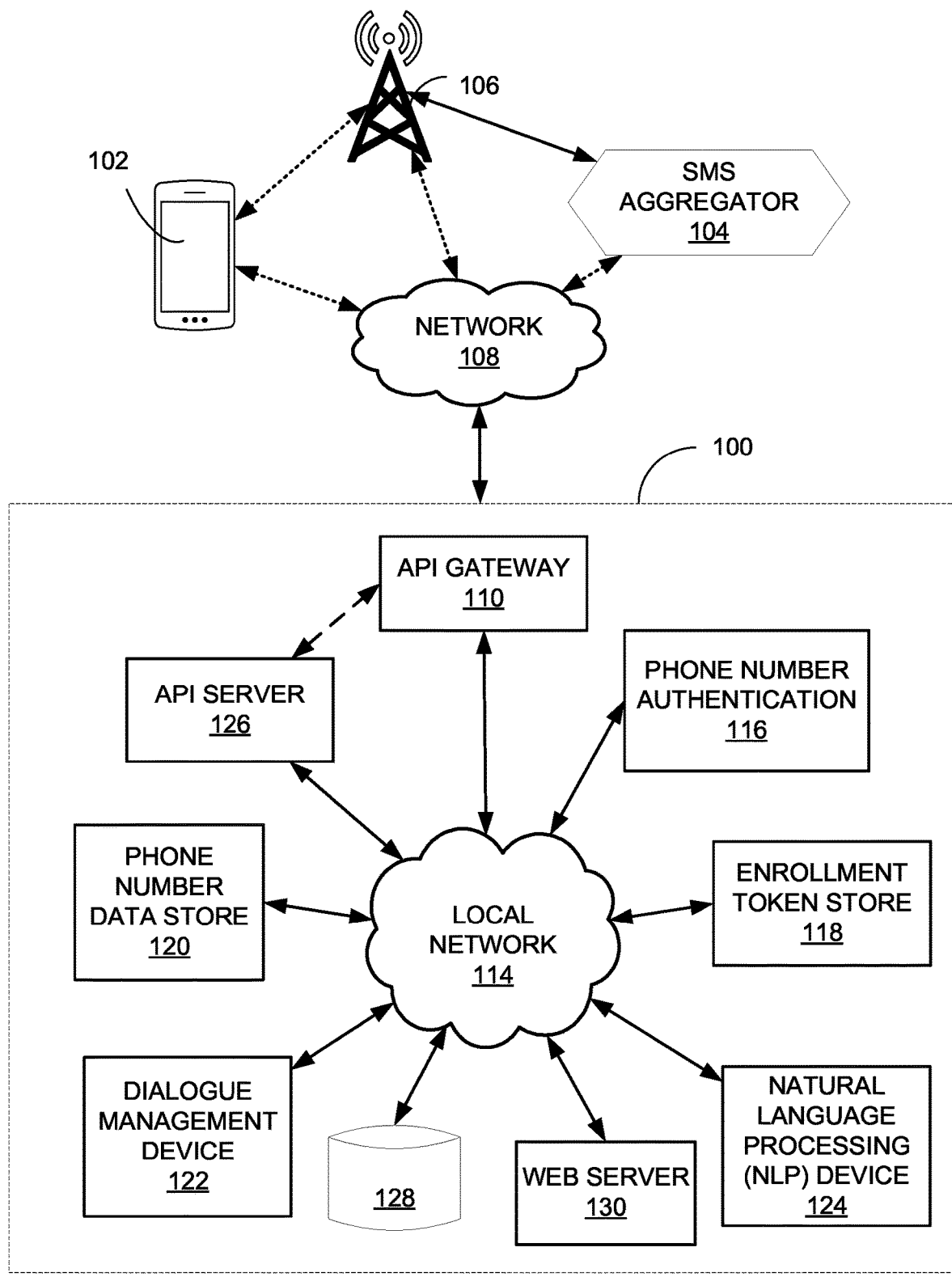
FIG. 1 is an example block diagram representing a system 100 that may be used for controlling enrollment and secure persistent SMS texting account servicing communications.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed technology and embodiments include systems and methods for controlling enrollment and secure persistent SMS texting account servicing communications. A system is provided that includes one or more processors in communication with: an enrollment web portal, a natural language dialogue module, a SMS texting gateway, a phone number data storage, and a token storage. The system includes memory in communication with the one or more processors and storing instructions that, when executed by the one or more processors, are configured to cause the system to receive, at the enrollment web portal, enrollment data. The enrollment data includes: enrollment credentials identifying a user for authentication, a phone number of a mobile device associated with the user, and consent by the user to persistently interact with the system via SMS. The one or more processors of the system are further configured to authenticate the user responsive to processing the received enrollment data, store, in the phone number data storage, the phone number, and generate, responsive to the authentication, a revocable token for persistent access to the natural dialogue module via the SMS texting gateway for a mobile device identified by the phone number.

In certain example implementations, the one or more processors may be further configured to initiate, responsive to the authentication, a persistent SMS texting session with the mobile device identified by the phone number.

In another embodiment, a computer-implemented method is provided that includes receiving, at an enrollment web portal, enrollment data including: enrollment credentials identifying a user for authentication, a phone number of a mobile device associated with the user, and consent by the user to persistently interact with an account servicing system via SMS texting. The method includes: processing the received enrollment data, authenticating the user responsive to processing the received enrollment data, storing the phone number of the mobile device associated with the user in a phone number data storage, and generating, responsive to the authenticating, a revocable token for persistent access to a natural dialogue module via a SMS texting gateway for the mobile device identified by the phone number. Certain example implementations of the disclosed technology may include storing, in the phone number data storage, consent to communicate with the account provider via SMS text.

Certain example implementations of the disclosed technology may further include initiating a persistent SMS texting session with the mobile device identified by the phone number and based on the revocable token.

In another embodiment, a non-transitory computer readable storage medium storing instructions is provided for use with one or more processors in communication with: an enrollment web portal, a natural language dialogue module, a SMS texting gateway, a phone number data storage, a token storage, and memory. The instructions are configured to cause the one or more processors to perform a method that includes: receiving, at the enrollment web portal, enrollment data including: enrollment credentials identifying a user for authentication, a phone number of a mobile device associated with the user, and consent by the user to persistently interact with an account servicing system via the SMS texting gateway. The instructions are further configured to cause the one or more processors to perform the method that includes processing the received enrollment data, authenticating the user responsive to processing the received enrollment data, storing the phone number of the mobile device associated with the user in the phone number data storage, generating, responsive to the authenticating, a revocable token for persistent access to a natural dialogue module via a SMS texting gateway for the mobile device identified by the phone number, and storing the revocable token in the token storage.

Certain example implementations of the disclosed technology utilize a natural language intelligent assistant for performing account servicing functions via SMS texting. Contact may be initiated with the intelligent assistant just as any other SMS recipient. For example, the intelligent assistant may include an identifier accessible from a list of contacts on a customer device with which an SMS conversation may be initiated. Certain example implementations can help address and overcome inefficiencies and security issues associated with conventional account servicing systems. For example, embodiments disclosed herein enable customers to access account information and/or perform account servicing functions by texting with the intelligent assistant—without having to login to a website or mobile app every time. Certain example implementations of the disclosed technology may provide an improved experience for a customer, by enabling account servicing through digital self-service channels without the friction of a customer having to navigate to a website or mobile app and/or provide login credentials each time there is an interaction with the system.

In an example implementation, customers may establish persistent secure access to account servicing via SMS text based on an initial (one-time) login and authentication process. In certain example implementations of the disclosed technology, a customer may perform the initial login to the website or mobile app by supplying authentication credentials (such as a code, two-factor authorization, biometric information, etc.). Once authenticated, a customer may be granted persistent SMS access by providing additional information, including (but not limited to) their mobile phone number, consent to communicate with the account provider via SMS text, and consent to service their account via SMS text. According to an example implementation of the disclosed technology, a user may revoke their consent to communicate with the account provider via SMS text, which may update the phone number status in a phone number data store (as will be discussed further with reference to FIGS. 1 and 4). In certain implementations, when the customer revokes consent, such action may cause the token in an enrollment token store to expire the next time the customer attempts to access the system via SMS text and/or when the phone number status is checked in the phone number data store. In certain example implementations, if the token has been revoked, or if it expires, the system may direct the customer back to the website or mobile app, to authenticate and provide consent to service their account via SMS text.

Certain example implementations of the disclosed technology provide a secure and persistent authentication process for accessing account servicing functions via SMS texting by utilizing a revocable token, which may be utilized to secure and protect access to sensitive information. For example, the mobile phone number and the consent to communicate with the account provider via SMS text may be persisted in a data store, which can only be changed while the customer is logged in. In certain example implementations, the revocable token may be based on the association of the customer's mobile phone number with their digital profile identification. In an example implementation, each time a customer interacts with the intelligent assistant via SMS text, the system checks the data store to verify that the customer still has the same mobile phone number and has not revoked consent to communicate via SMS text. The token is also checked to see if it is still valid. If the revocable token has expired, customers must log in to the website or mobile app again to re-establish the persistent authentication token for account servicing via SMS text. According to an example implementation of the disclosed technology, the revocable token is distinguished from a typical "one-time" token in that the revocable token may persist indefinitely until it is revoked (by the customer or based on a policy) or it may persist for a duration (for example, 60 days, 120 days, months, etc.) until it is revoked or until it expires.

In accordance with certain example implementations of the disclosed technology, the token may expire when any of the following occurs: the customer changes their mobile number; the customer revokes consent to communicate via SMS text; the customer revokes consent to service their account via SMS text; the customer does not service their account via SMS text for a pre-determined number of days; and/or the customer's mobile number appears on a list of mobile numbers that have switched carriers, as well as any other determination that the customer's mobile device has been compromised or may no longer be considered a trusted device. In accordance with certain example implementations of the disclosed technology, a mobile number that has been assigned to a new carrier may be detected by an automated process that checks the customer's mobile number against mobile number feed provided by wireless carriers.

Reference will now be made in detail to example embodiments of the disclosed technology, examples of which are illustrated in the accompanying figures and disclosed herein. Wherever convenient, the same references numbers will be used throughout the drawings to refer to the same or like parts.

FIG. 1 is an example block diagram representing a system 100 that may be used for controlling enrollment and secure persistent SMS texting account servicing communications, according to an example implementation of the disclosed technology. System 100 may be provided or controlled by an account provider organization, a non-limiting example including a financial service provider. The account servicing may be facilitated by the dialog management device 122 and/or the natural language processing (NLP) device 124 of the system, as will be further explained. In certain example implementations, the system 100 may be configured to perform one or more of: authentication, enrollment in SMS account servicing, token control, and account servicing. The system 100 utilizes automated natural language dialogue that may adaptively respond to customer messages based on an evolving customer context associated with a given customer. The components and arrangements shown in FIG. 1 are not intended to limit the disclosed embodiments as the components used to implement the disclosed processes and features may vary.

As shown in FIG. 1, the system 100 may be utilized to communicate with a user device 102 via various paths, such as through a SMS aggregator 104 (or gateway), which may serve as an intermediary between mobile service providers 106 and the system 100. In certain example implementations, the SMS aggregator 104 and/or the user device 102 may be in communication with the system 100 via a network 108, including, but not limited to the Internet. Certain example implementations of the disclosed technology can include a local area network 114 for communication with the various modules of the system.

In certain example implementations, the system can include an API gateway 110 to act as a "front door" for applications access data, logic, and/or functionality from the API server 126 and/or other back-end services. In certain example implementations, the API gateway 110 may be configured to handle tasks involved in accepting and processing concurrent API calls, including traffic management, authorization, access control, monitoring, API version management, etc.

In accordance with certain example implementations of the disclosed technology, the system 100 may be operated by an account provider and may include one or more of: a phone number authentication module 116, an enrollment token store 118, a phone number data store 120, a dialogue management device 122, a natural language processing (NLP) device 124, memory 128 (which may house one or more databases), and one or more web servers 130. As shown, the various modules 110-130 may be in communication via the local network 114. In accordance with certain example implementations of the disclosed technology, the phone number authentication module 116 may be utilized to receive and/or parse and/or decode an incoming SMS message to extract the sender's phone number. For example, the SMS message may arrive at the system 100 in the form of a SMS protocol description unit (PDU) string that can include encoded information identifying the number to which the message is to be sent, the sender's phone number, the SMS message, and other identifiers. In certain example implementations, the phone number authentication module 116 may extract and decode (or receive) the (extracted/decoded) sender's phone number and may access the phone number data store 120 to determine if the extracted phone number matches with any of the phone number stored in the phone number data store 120. In certain example implementations, the phone number data store 120 may take the form of a searchable database and/or a look-up table that stores phone numbers for customers of the account provider. In one example implementation of the disclosed technology, the phone number data store 120 may store mobile phone numbers for authenticated, consenting customers who are currently enrolled in the account servicing via SMS messages. In certain example implementations, the phone number data store 120 may include fields with all known phone numbers of existing customers, and one or more fields associated with each phone number that may indicate a status of the phone number. In this implementation, the phone number authentication module 116 may read both fields and authenticate the sender's mobile phone number if there is a corresponding matching phone number in the phone number data store 120, and if the status field indicates that the number is associated with an authenticated and consenting customer. In accordance with certain example implementations of the disclosed technology, the enrollment token store 118 may take the form of a searchable database and/or a look-up table (similar to the phone number data store 120) that stores uniquely identifiable revocable tokens for customers of the account provider. In one example implementation of the disclosed technology, the enrollment token store 118 may store tokens for authenticated, consenting customers who are currently enrolled in the account servicing via SMS messages. In certain example implementations, the enrollment token store 118 may include fields with account identifiers for existing customers and/or one or more fields indicating a status of the associated revocable tokens (i.e., for authenticated and consenting customers, or otherwise). In certain example implementations, the phone number authentication module 116 may read one or more fields in the enrollment token store 118 to determine the status of the associated revocable token. Additional descriptions of these and related processes involving the modules 110-130 will be explained further with reference to FIGS. 2-4.

In some embodiments, a customer may operate user device 102. User device 102 can include one or more of a mobile device, smart phone, general purpose computer, tablet computer, laptop computer, smart wearable device, voice command device, other mobile computing device, or any other device capable of communicating via SMS with the service provider 106 and/or the network 108, and ultimately communicating with one or more components of the system 100.

According to an example implementation of the disclosed technology, the user device 102 may belong to or be provided by a customer, or may be borrowed, rented, or shared. Customers may include individuals such as, for example, subscribers, clients, prospective clients, or customers of an entity associated with an organization, such as individuals who have obtained, will obtain, or may obtain a product, service, or consultation from an entity associated with the organization. According to some embodiments, the user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors.

According to an example implementation of the disclosed technology, the network 108 may be of any suitable type, including individual connections via the Internet such as cellular or WiFi networks. In some embodiments, network 108 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

According to an example implementation of the disclosed technology, the network 108 may include any type of computer networking arrangement used to exchange data. For example, the network 108 may be the Internet, a private data network, virtual private network using a public network, and/or other suitable connection(s) that enables components in the system 100 to send and receive information between the components of the system 100. In certain example implementations, the network 108 may also include a public switched telephone network ("PSTN") and/or a wireless network.

In accordance with certain example implementations of the disclosed technology, the system 100 may be associated with and optionally controlled by an entity such as a business, corporation, individual, partnership, or any other entity that provides one or more of goods, services, and consultations to individuals such as customers. The system 100 can include or be in contact with one or more servers and computer systems for performing one or more functions associated with products and/or services that an organization provides. Such servers and computer systems may include, for example, web servers, call center servers, and/or transaction servers, as well as any other computer systems necessary to accomplish tasks associated with the organization and/or the needs of customers (which may be customers of the entity associated with the organization). In an example implementation, the system may include a web server 130 configured to generate and provide one or more websites accessible to customers, as well as any other individuals involved in the organization normal operations.

According to an example implementation of the disclosed technology, the web server 130 may include a computer system configured to receive communications from a user device 102 via for example, a mobile application, a chat program, an instant messaging program, a voice-to-text program, an SMS message, email, or any other type or format of written or electronic communication. The web server 130 may include one or more processors and one or more web server databases, which may be any suitable repository of website data. Information stored in web server 130 may be accessed (e.g., retrieved, updated, and added to) via the local network 114 and/or the network 108 by one or more devices (e.g., dialogue management device 122) of the system 100. In some embodiments, one or more processors may be used to implement an automated natural language dialogue system that may interact with a customer via different types of communication channels such as a website, mobile application, instant messaging application, SMS message, email, or any other type of electronic communication. In certain example implementations, when an incoming message is received from a user device 102, the web server 130 may be configured to determine the type of communication channel user device 102 used to generate the incoming message.

Certain example implementations of the system 100 may also include one or more call center servers (not shown) that may include a computer system configured to receive, process, and route telephone calls and other electronic communications between a customer operating user device 102 and the dialogue management device 122. Information stored in call center server, for example may be accessed (e.g., retrieved, updated, and added to) via local network 114 and/or the network 105 by one or more devices (e.g., dialogue management device 122) of system 100. In some embodiments, one or more processors may be used to implement an interactive voice response (IVR) system that interacts with the customer over the phone.

Certain example implementations of the system 100 may also include one or more transaction servers (not shown) that may include a computer system configured to process one or more transactions involving an account associated with customers, or a request received from customers. In some embodiments, transactions can include, for example, a product/service purchase, product/service return, financial transfer, financial deposit, financial withdrawal, financial credit, financial debit, dispute request, warranty coverage request, and any other type of transaction associated with the products and/or services that an entity associated with the organization provides to individuals such as customers. The transaction server, for example, may have one or more processors and one or more transaction server database, which may be any suitable repository of transaction data. Information stored in transaction server may be accessed (e.g., retrieved, updated, and added to) via local network 114 and/or network 108 by one or more devices (e.g., dialogue management device 122) of system 100.

In some embodiments, a transaction server may track and store event data regarding interactions between a third party and the organization on behalf of the customer. For example, third party interactions may be tracked, which can include purchase requests, refund requests, warranty claims, account withdrawals and deposits, and any other type of interaction that a third-party server may conduct with the organization on behalf of an individual such as customer.

In accordance with certain example implementations of the disclosed technology, the local network 114 may include any type of computer networking arrangement used to exchange data in a localized area, such as WiFi, Bluetooth™ Ethernet, and other suitable network connections that enable components of the organization to interact with one another and to connect to the network 108 for interacting with components of the system 100. In some embodiments, the local network 114 can include an interface for communicating with or linking to the network 108. In other embodiments, components of an organization may communicate via the network 108, without a separate local network 114.

In accordance with certain example implementations of the disclosed technology, and with continued reference to FIG. 1, the dialogue management device 122 can include one or more computer systems configured to compile data from a plurality of sources, such as the web server 130, a call center server, and/or a transaction server. In certain example implementations, the dialogue management device 122 may be utilized to correlate compiled data, analyze the compiled data, arrange the compiled data, generate derived data based on the compiled data, and store the compiled and derived data in a database such as database 128. According to some embodiments, database 128 may be associated with an organization and/or its related entity and may store a variety of information relating to customers, transactions, and business operations. In certain example implementations, the database 128 may also serve as a back-up storage device. In certain example implementations, the database 128 may be accessed by dialogue management device 122 and may be used to store records of every interaction, communication, and/or transaction a particular customer has had with the system 100 and/or its related entity in the past, for example, to enable the creation of an ever-evolving customer context that may enable dialogue management device 122 to provide customized and adaptive dialogue when interacting with the customer.

In accordance with certain example implementations of the disclosed technology, the API server 126 may include a computer system configured to execute one or more application program interfaces (APIs) that provide various functionalities related to the operations of the system 100. In some embodiments, API server 126 may include API adapters that enable the API server 126 to interface with and utilize enterprise APIs maintained by the system 100 and/or an associated API's that may be housed on other systems or devices. In some embodiments, APIs can provide functions that include, for example, retrieving customer account information, modifying customer account information, executing a transaction related to an account, scheduling a payment, authenticating a customer, updating a customer account to opt-in or opt-out of notifications, and any other such function related to management of customer profiles and accounts. In certain example implementations, the API server 126 may include one or more processors and/or one or more API databases, which may be any suitable repository of API data. In certain example implementations, information stored in the API server 126 may be accessed (e.g., retrieved, updated, and added to) via local network 114 and/or network 108 by one or more devices (e.g., dialogue management device 122) of the system 100. In some embodiments, an API processor may be used to implement one or more APIs that can access, modify, and retrieve customer account information. In certain embodiments, real-time APIs consistent with certain disclosed embodiments may use Representational State Transfer (REST) style architecture, and in this scenario, the real time API may be called a RESTful API.

In certain embodiments, a real-time API may include a set of Hypertext Transfer Protocol (HTTP) request messages and a definition of the structure of response messages. In certain aspects, the API may allow a software application, which is written against the API and installed on a client (such as, for example, a transaction server) to exchange data with a server that implements the API (such as, for example, API server 126), in a request-response pattern. In certain embodiments, the request-response pattern defined by the API may be configured in a synchronous fashion and require that the response be provided in real-time. In some embodiments, a response message from the server to the client through the API consistent with the disclosed embodiments may be in the format including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). Additionally, or alternatively, the client may send GET and POST requests with JSON serialized parameters in the body. Preferably, the requests with JSON serialized parameters use "application/j son" content-type. In another aspect, an API design may also require the server implementing the API return messages in JSON format in response to the request calls from the client.

With continued reference to FIG. 1, the system 100 may include a natural language processing device (NLP device) 124, which may include a computer system configured to receive and process incoming dialogue messages and determine a meaning of the incoming dialogue message. For example, the NLP device 124 may be configured to receive and execute a command containing an incoming dialogue message where the command instructs the NLP device 124 to determine the meaning of the incoming dialogue message. The NLP device 124 may be configured to continuously or intermittently listen for and receive commands from a command queue to determine if there are any new commands directed to the NLP device 124. Upon receiving and processing an incoming dialogue message, the NLP device 124 may output the meaning of an incoming dialogue message in a format that other devices can process. For example, the NLP device 124 may receive an incoming dialogue message stating "Hello, I would like to know my account balance please," and may determine that this statement represents a request for an account balance. In certain example implementations, the NLP device 124 may be configured to output an event representing the meaning of the incoming dialogue message to an event queue for processing by another device. In some embodiments, the NLP device 124 may be configured to generate a natural language phrase in response to receiving a command. Accordingly, in some embodiments, the NLP device 124 may be configured to output an event that contains data representing natural language dialogue.

In accordance with certain example implementations of the disclosed technology, the NLP device 124 may include one or more processors and one or more NLP databases, which may be any suitable repository of NLP data. Information stored in the NLP device 124 may be accessed (e.g., retrieved, updated, and added to) via local network 114 and/or network 108 by one or more devices (e.g., the dialogue management device 122) of the system 100. In some embodiments, an NLP processor may be used to implement an NLP system that can determine the meaning behind a string of text and convert it to a form that can be understood by other devices.

Although the preceding description describes various functions of a web server 130, call center server, transaction server, dialogue management device 122, database 128, an API server 126, and a natural language processing (NLP) device 124, in some embodiments, some or all of these functions may be carried out by a single computing device.

The features and other aspects and principles of the disclosed embodiments may be implemented in various environments specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, certain disclosed embodiments may be implemented by general purpose machines configured to execute special software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

Figure 2:
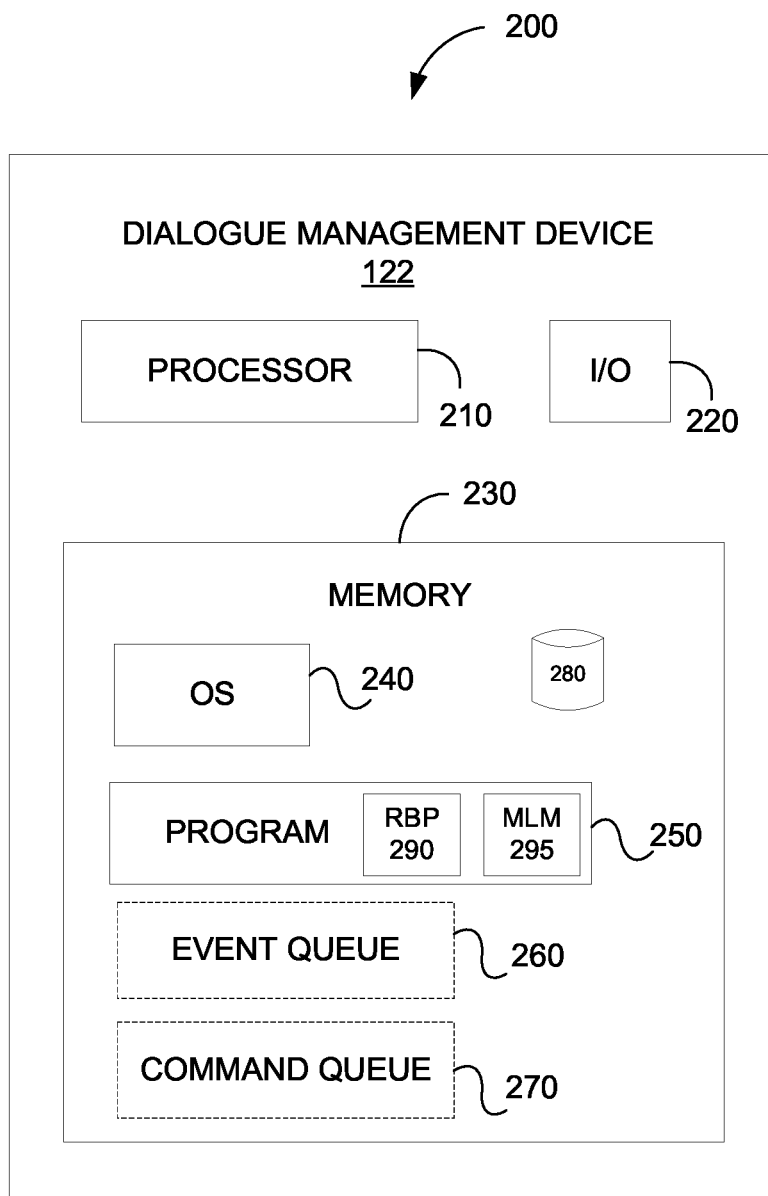
FIG. 2 is a component diagram 200 of an example dialogue management device.

FIG. 2 is a component diagram 200 depicting additional details of the example dialogue management device 122 (as shown in FIG. 1). In certain example implementations, one or more of the modules or components 110-130 as shown and discussed above with reference to FIG. 1 (for example, the phone number authentication module 116, the enrollment token store 118, the phone number data store 120, the natural language processing (NLP) device 124, the database 128, and one or more web servers 130) may be configured similarly as described with respect to dialogue management device 122. As shown in FIG. 2, dialogue management device 122 may include a processor 210, an input/output ("I/O") device 220, a memory 230 containing an operating system ("OS") 240 and a program 250. For example, dialogue management device 122 may be a single server or may be configured as a distributed computer system including multiple servers or computers that interoperate to perform one or more of the processes and functionalities associated with the disclosed embodiments. In some embodiments, the dialogue management device 122 may further include a peripheral interface, a transceiver, a mobile network interface in communication with the processor 210, a bus configured to facilitate communication between the various components of the dialogue management device 122, and a power source configured to power one or more components of the dialogue management device 122.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

The processor 210, for example, may include one or more of a microprocessor, microcontroller, digital signal processor, co-processor or the like or combinations thereof capable of executing stored instructions and operating upon stored data. The memory 230, for example, may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

In certain example implementations, the processor 210 may be one or more known processing devices, such as, but not limited to, a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

According to an example implementation of the disclosed technology, the dialogue management device 122 may include one or more storage devices configured to store information used by processor 210 (or other components) to perform certain functions related to the disclosed embodiments. In one example the dialogue management device 122 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, dialogue management device 122 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, dialogue management device 122 may include memory 230 that may include one or more programs 250 to perform one or more functions of the disclosed embodiments. For example, in some embodiments, dialogue management device 122 may include a rules-based platform (RBP) 290 for generating zero or more commands in response to processing an event, in accordance with a set of predefined rules. In some embodiments, dialogue management device 122 may include a trained machine learning model (MLM) 295 for generating zero or more commands in response to processing an event, in accordance with a model that may be continuously or intermittently updated. Moreover, the processor 210 may execute one or more programs 250 located remotely from system 100. For example, system 100 may access one or more remote programs 250 (such as rules-based platform 290 or trained machine learning model 295), that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by processor 210, perform one or more processes consistent with the disclosed embodiments. In some embodiments, memory 230 may include a customer information database 280 for storing related data to enable dialogue management device 122 to perform one or more of the processes and functionalities associated with the disclosed embodiments. The customer information database 280 may include stored data relating to a customer profile and customer accounts, such as for example, customer identification information (e.g., name, age, sex, birthday, address, VIP status, key customer status, preferences, preferred language, vehicle(s) owned, greeting name, channel, talking points (e.g., favorite sports team), etc.), bank accounts, mortgage loan accounts, car loan accounts, other such accounts, account numbers, authorized users associated with one or more accounts, account balances, account payment history, and other such typical account information. The customer information database 280 may further include stored data relating to previous interactions between an organization (or its related entity) and a customer. For example, the customer information database 280 may store customer interaction data that includes records of previous customer service interactions with a customer via a website, SMS, a chat program, a mobile application, an IVR system, or notations taken after speaking with a customer service agent. The customer information database 280 may also include information about business transactions between an organization (and/or its related entity) and a customer that may be obtained from, for example, a transaction server. The customer information database 280 may also include customer feedback data such as an indication of whether an automated interaction with a customer was successful, online surveys filled out by a customer, surveys answered by a customer following previous interactions to the account provider, digital feedback provided through websites or mobile application associated with the organization or its related entity (e.g., selecting a smiley face or thumbs up to indicate approval), reviews written by a customer, complaint forms filled out by a customer, information obtained from verbal interactions with customer (e.g., information derived from a transcript of a customer service call with customer that is generated using, for example, voice recognition techniques) or any other types of communications from a customer to the organization or its related entity. According to some embodiments, the functions provided by the customer information database 280 may also be provided by a database that is external to the dialogue management device 122.

In accordance with certain example implementations of the disclosed technology, the memory 230 may also include an event queue 260 for temporarily storing queued events and a command queue 270 for temporarily storing queued commands. The processor 210 may receive events from the event queue 260 and in response to processing the event using the rules-based platform 290 and/or the trained machine learning model 295, generate zero or more commands to be output to the command queue 270. According to some embodiments, dialogue management device 122 may place commands in the command queue 270 in the order they are generated. In certain example implementations of the disclosed technology, the command queue 270 may be monitored to detect commands that are designated to be executed by the monitoring device and may access pertinent commands. The event queue 260 may receive events from other devices. According to some embodiments, events may be placed in the event queue 260 in a first-in first-out (FIFO) order, such that events may then processed by the dialogue management device 122 in the order they are received or generated.

The dialogue management device 122 may also be communicatively connected to one or more memory devices (e.g., databases) locally or through a network. The remote memory devices may be configured to store information and may be accessed and/or managed by dialogue management device 122. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The dialogue management device 122 may also include one or more I/O devices 220 that may include one or more interfaces for receiving signals or input from devices and providing signals or output to one or more devices that allow data to be received and/or transmitted by dialogue management device 122. For example, dialogue management device 122 may include interface components, which may provide interfaces to one or more input devices, such as one or more keyboards, mouse devices, touch screens, track pads, trackballs, scroll wheels, digital cameras, microphones, sensors, and the like, that enable dialogue management device 122 to receive data from one or more users (such as, for example, via user device 102, as discussed with reference to FIG. 1).

In certain embodiments of the disclosed technology, the dialogue management device 122 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While dialogue management device 122 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the dialogue management device 122 may include a greater or lesser number of components than those illustrated.

Figure 3:
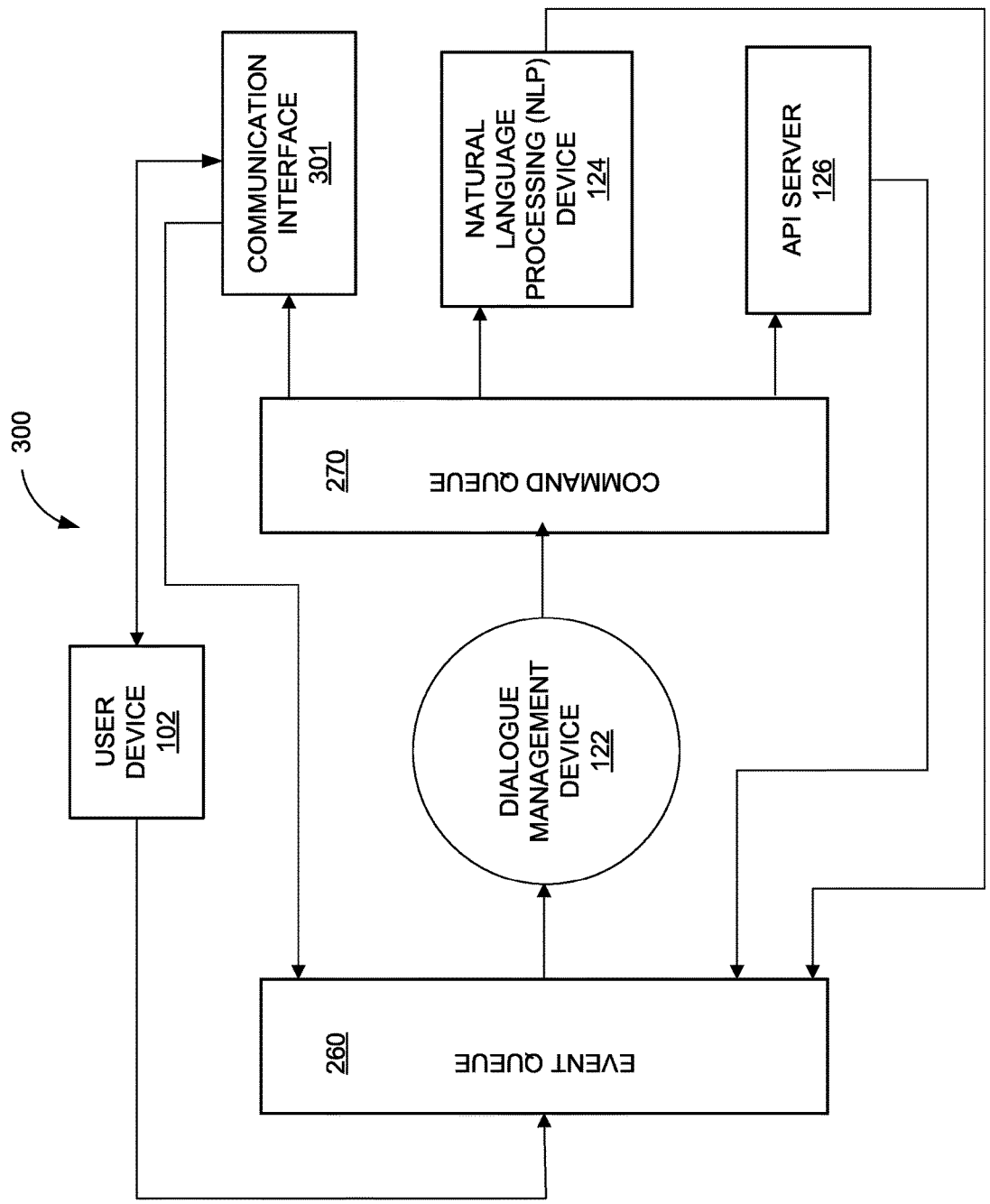
FIG. 3 is an example intelligent assistant system functionality diagram 300 for providing automated natural language dialogue for account servicing via SMS texting.

FIG. 3 is an example intelligent assistant system functionality diagram 300 for providing automated natural language dialogue for account servicing via SMS texting. Certain processes discussed with respect to FIG. 3 (as discussed in detail below) may be executed by the system 100, as discussed above with respect to FIG. 1.

Figure 4:
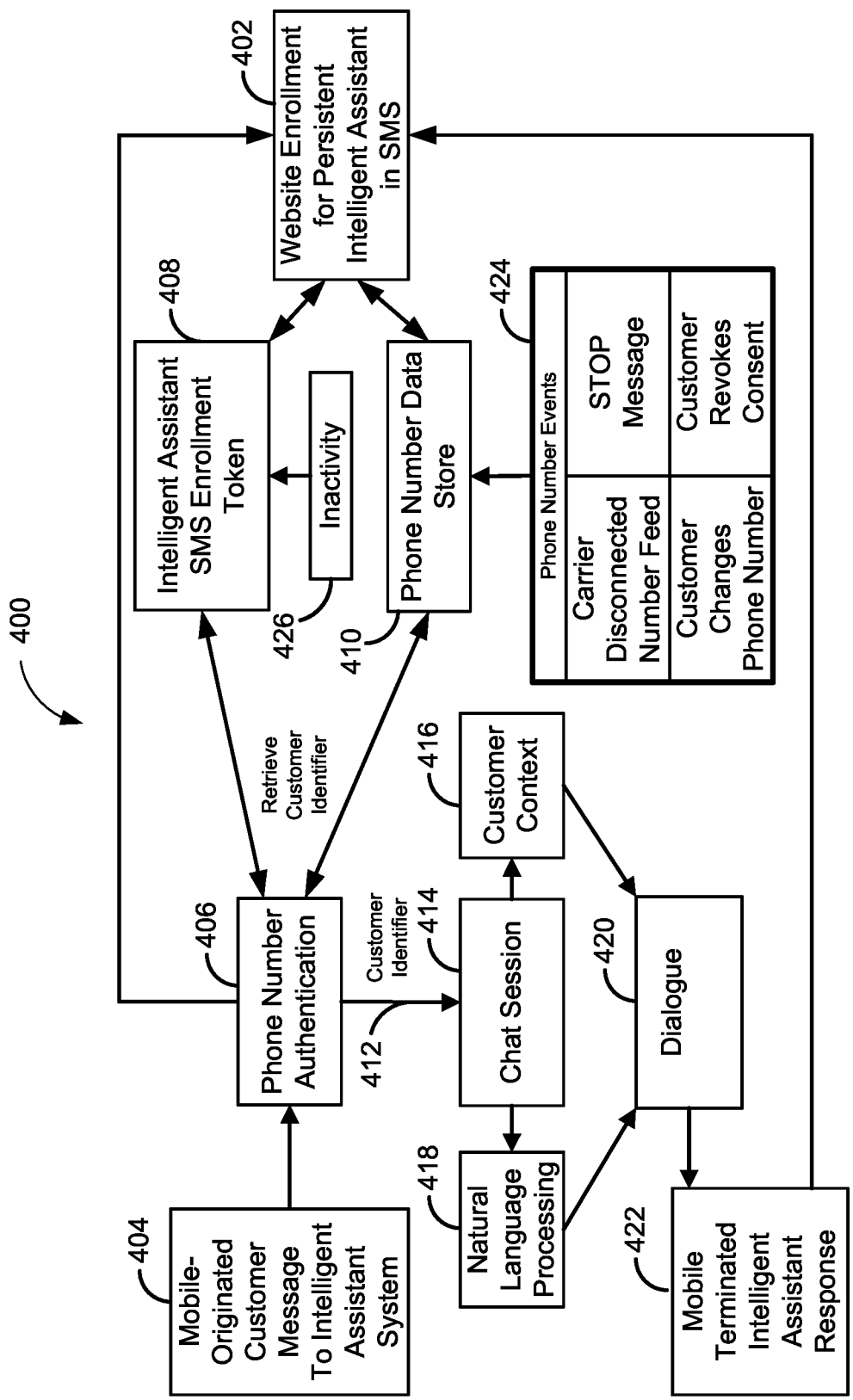
FIG. 4 is an example system functionality diagram of a process 400 for controlling enrollment and secure persistent account servicing communications via SMS texting.

FIG. 4 is an example system functionality diagram of a process 400 for controlling enrollment and secure persistent account servicing communications via SMS texting. In some embodiments, the process 400 of FIG. 4 may correspond to, and/or be implicit in the system functionality diagram 300 as shown in FIG. 3. For example, the process 400, as depicted in FIG. 4 (and discussed in detail below) may be performed by the dialogue management device 122 (with associated processor 210 executing program instructions 250 in memory 230, as discussed above with reference to FIG. 2.) In some embodiments, certain portions of the functionality of the process 400 may be delegated, as appropriate, to other elements in the system 100 discussed with reference to FIG. 1.

With continued reference to FIG. 3, a first event may be placed in the event queue 260 in response to receiving a customer dialogue message, for example, from the user device 102. According to certain example implementations of the disclosed technology, a customer dialogue message may be sent using various communication mediums, such as for example, SMS, a voice-to-text device, a chat application, an instant messaging application, a mobile application, an IVR system, or any other such medium that may be sufficient to send and receive electronic communications. Responsive to the incoming customer dialog message, the event may be generated by, for example, a RESTful API interfacing with a receiving device of the system 100.

In accordance with certain example implementations of the disclosed technology, after the event is created, it may be placed in the event queue 260. An event queue 260 may be configured to temporarily store a plurality of events. According to some embodiments, events are placed in the event queue in a first-in first-out (FIFO) manner, such that the events will be executed in the order that they were received. In some embodiments, the event queue 260 and/or the command queue 270 may be part of the dialogue management device 122. In some embodiments, both the event queue 260 and the command queue 270 may be present on a device or component other than dialogue management device 122. For example, in some embodiments, the event queue 260 and the command queue 270 may be maintained on a cloud server that is accessible by the dialogue management device 122, the API server 126, the NLP device 124, and/or the communication interface 301. According to some embodiments, an event may represent different types of information such as, for example, text received from a customer, customer account information, or a request to perform some account-related action. For example, an event might represent a user dialogue message that has been sent to system 100 via SMS that read "Hello, can you please tell me my account balance?" According to some embodiments, an event may have certain metadata (such as a phone number and/or token) associated with it that is sufficient to allow the system to determine the identity of a customer associated with the event and/or a communication medium from which the even originated, as will be discussed below with reference to FIG. 4.

According to some embodiments, the dialogue management device 122 may continuously or intermittently monitor the event queue 260. In response to detecting an event (e.g., the first event) in the event queue, the event may be received at the dialogue management device 122 from the event queue 260. In some embodiments, the dialogue management device 122 may include a rules-based platform, a trained machine learning model, and a customer context. According to some embodiments, the customer context may be derived from customer information associated with a particular customer that is stored in the system 100. For example, customer information may be stored in the phone number data store 120, the enrollment token store 118, and/or the database 128 shown in FIG. 1, and/or the database 280 shown in FIG. 2. In some embodiments, the customer information may include one or more of account types, account statuses, phone number, token, transaction history, conversation history, people models, an estimate of customer sentiment, customer goals, and customer social media information. In accordance with certain example implementations of the disclosed technology, the system 100 may be configured to adapt and tailor its responses to a particular customer based on the customer context and/or customer information. According to some embodiments, the customer context may be updated each time the dialogue management device 122 receives a new event from the event queue 260. For example, in some embodiments, the customer context may be updated by the dialogue management device 122 responsive to receiving updated customer information.

In certain example implementations, the dialogue management device 122 may, in response to processing the first event, generate a first command to be placed in a command queue 270. According to some embodiments, the dialogue management device 122 may generate a command based on the processed event, the customer context, and/or customer information using one or more of a rules-based platform 290 and a trained machine learning model 295 as discussed with reference to FIG. 2. For example, in some use cases a command may be generated using the rules-based platform 290, whereas in other use cases a command may be generated using the trained machine learning model 295, and further use cases may be handled by both the rules-based platform 290 and the trained machine learning model 295 working in concert. In some embodiments, the trained machine learning model 295 may be used as a way of enhancing the performance of the rules-based platform 290 by, for example, determining which rules have priority over other rules and what rules should be applied in a given context. According to some embodiments, the commands generated by the dialogue management device 122 in response to a particular event may change as the customer context and/or customer information is updated over time. Further, changes to the rules in the rules-based platform 290 or further training of the machine learning model 295 may also result in different commands being generated in response to the same event. According to some embodiments, the trained machine learning model 295 may be trained by updating a natural language processing device database with communications from customers that have been labeled using, for example, a web user interface. Such data in the natural language processing device database may undergo supervised training in a neural network model using a neural network training algorithm while the model is offline before being deployed in the system 100.

According to some embodiments, a NLP model of the system 100 may utilize deep learning models such as convolutional neural network (CNN) that transforms a word into a word vector and long short-term memory (LSTM) that transforms a sequence of word vectors into intent. The NLP model may also be trained to recognize named entities in addition to intents. For example, a named entity may include persons, places, organizations, account types, and product types. According to some embodiments, when the dialogue management device 122 generates a command, such as a first command, it may determine an entity that will execute the command, such as, for example, the API server 126, the NLP device 124, a communication interface 301, or some other device or component, such that only the determined type of entity may pull the command from the command queue 270. For example, in the embodiment shown in FIG. 3, the dialogue management device 122 may determine that the first command is to be executed by the NLP device 124 to determine the meaning of the incoming customer dialogue message. According to some embodiments, at the time the dialogue management device 122 creates a new command, the dialogue management device may also update the customer information database 280 (and/or database 128) with information about a previous or concurrent transaction or customer interaction.

In accordance with certain example implementations of the disclosed technology, and with continued reference to FIG. 3, the NLP device 124 may receive the first command from the command queue 270, execute the command, and generate a second event to be placed in the event queue 260. According to some embodiments, the NLP device 124 may continuously or intermittently monitor the command queue 270 to detect new commands and upon detecting a new command, may receive the command from the command queue 270. Upon receiving a command, the NLP device 124 may perform various functions depending on the nature of the command. For example, in some cases, the NLP device 124 may determine the meaning of an incoming dialogue message in response to executing the command. According to some embodiments, the NLP device 124 may determine the meaning of an incoming dialogue message by utilizing one or more of the following artificial intelligence techniques: intent classification, named entity recognition, sentiment analysis, relation extraction, semantic role labeling, question analysis, rule extraction and discovery, and story understanding. Intent classification may include mapping text, audio, video, and/or or other media into an intent chosen from a set of intents, which represent what a customer is stating, requesting, commanding, asking, or promising, in an incoming customer dialogue message. Intent classifications may include, for example, a request for an account balance, a request to activate a credit/debit card, an indication of satisfaction, a request to transfer funds, or any other intent a customer may have in communicating a message. Named entity recognition may involve identifying named entities such as persons, places, organizations, account types, and product types in text, audio, video, or other media. Sentiment analysis may involve mapping text, audio, video, or other media into an emotion chosen from a set of emotions. For example, a set of emotions may include positive, negative, anger, anticipation, disgust, distrust, fear, happiness, joy, sadness, surprise, and/or trust. Relation extraction may involve identifying relations between one or more named entities in text, audio, video, or other media. A relation may be for example, a "customer of" relation that indicates that a person is a customer of an organization. Semantic role labeling may involve identifying predicates along with roles that participants play in text, audio, video, or other media. An example of semantic role labeling may be identifying (1) the predicate Eat, (2) Tim, who plays the role of Agent, and (3) orange, which plays the role of Patient, in the sentence "Tim ate the orange." Question analysis may involve performing natural language analysis on a question, including syntactic parsing, intent classification, semantic role labeling, relation extraction, information extraction, classifying the type of question, and identifying what type of entity is being requested. Rule extraction and discovery may involve extracting general inference rules in text, audio, video, or other media. An example of rule extraction may be extracting the rule that "When a person turns on a light, the light will light up" from "Matt turned on the light, but it didn't light up." Story understanding may involve taking a story and identifying story elements including (1) events, processes, and states, (2) goals, plans, intentions, needs, emotions, and moods of the speaker and characters in the story, (3) situations and scripts, and (4) themes, morals, and the point of the story.

In some cases, the NLP device 124 may perform natural language generation in response to receiving a command. According to some embodiments, the NLP device 124 may perform natural language generation by utilizing one or more of the following artificial intelligence techniques: content determination, discourse structuring, referring expression generation, lexicalization, linguistic realization, explanation generation. Content determination may involve deciding what content to present to the customer out of all the content that might be relevant. Discourse structuring may involve determining the order and level of detail in which content is expressed. Referring expression generation may involve generating expressions that refer to entities previously mentioned in a dialogue. Lexicalization may involve deciding what words and phrases to use to express a concept. Linguistic realization may involve determining what linguistic structures, such as grammatical constructions, to use to express an idea. Explanation generation may involve generating a humanly-understandable, transparent explanation of a conclusion, chain of reasoning, or result of a machine learning model. In the example embodiment shown in FIG. 3, the NLP device 124 may determine the meaning of the incoming customer dialogue message and may convert it to a form that can be processed by the dialogue management device 122. Accordingly, the second event generated by the NLP device 124 may represent a determined meaning of the incoming customer dialogue message and the NLP device 124 may send the second event to the event queue 260.

In accordance with certain example implementations of the disclosed technology, the dialogue management device 122 may receive the second event from the event queue 260. In some embodiments, the dialogue management device 122 may also update the customer context by receiving updated customer information. In response to processing the second event, the dialogue management device 122 may generate a second command to be placed in a command queue 270. According to some embodiments, dialogue management device 122 may generate the second command based on the processed event, the customer context, and/or the customer information using one or more of a rules-based platform 290 and a trained machine learning model 295 as described above with respect to FIG. 2.

In the example embodiment shown in FIG. 3, the second event may represent a customer's request to know, for example, their account balance. Based on the customer context, customer information, rules-based platform 290 and/or trained machine learning model 295, the dialogue management device 122 may decide, for example, using predictive analytics that it has enough information to create a second event that represents instructions to an API associated with the API server 126 to look up the customer's account balance. However, in some embodiments, the dialogue management device 122 may decide that, for example, it is too uncertain as to which account the customer is seeking information about and may instead create a second event that represents instructions to the communication interface 301 to send a message to the user device 102 requesting more information. Accordingly, based on the customer context, the rules-based platform 290, and the trained machine learning model 295, the dialogue management device 122 may change or adapt its responses to a given request over time.

In accordance with certain example implementations of the disclosed technology, the API server 126 may receive the second command from command queue 270, execute the command, and generate a third event to be placed in event queue 260. According to some embodiments, the API server 126 may continuously or intermittently monitor the command queue 270 to detect new commands and, upon detecting a new command, may receive the command from the command queue 270. Upon receiving a command, the API server 122 may perform various functions depending on the nature of the command. For example, in some cases, the API server 122 call up an API stored locally or remotely on another device, to retrieve customer data (e.g., retrieve an account balance), perform an account action (e.g., make a payment on a customer account), authenticate a customer (e.g., verify customer credentials), check a status of a revocable token, and/or execute an opt-in/opt-out command (e.g., change account to opt-in to paperless notifications, opt-in or opt-out of account servicing by SMS texting, etc.). Accordingly, in some embodiments, the third event may represent, for example, a retrieved account balance, an acknowledgement of the performance of an account action, an acknowledgement of the execution of an opt-in/opt-out command, a verification or denial of a customer's credentials, a revocation of a token, etc.

In certain example implementations, the dialogue management device 122 may receive the third event from the event queue 260 in response to detecting it as described above. In some embodiments, dialogue management device 122 may also update the customer context by receiving updated customer information. The dialogue management device 122 may, in response to processing the third event, generate a third command to be placed in command queue 270. According to some embodiments, dialogue management device 122 may generate the third command based on the processed third event, the customer context, and/or customer information using one or more of rules-based platform 290 and trained machine learning model 295 in a fashion similar to the generation of the first command described above. In some embodiments, dialogue management device 122 may also generate a response dialogue message in response to processing an event, such as the third event. In some embodiments, dialogue management device 122 may receive a response dialogue message as an event produced by NLP device 124. According to some embodiments, the third command may represent a command or instruction to communication interface 301 to transmit the response dialogue message to, for example, user device 102.

In certain example implementations, the communication interface 301 may receive and execute the third command, which may cause the communication interface 301 to transmit (e.g., via SMS) the response dialogue message to user device 102. In some embodiments, the communication interface 301 may continuously or intermittently monitor the command queue 270 for new commands and may receive the third command in response to detecting the third command in command queue 270. According to some embodiments, the communication interface 301 may be a standalone device having some or all of the elements of dialogue management device 122 as shown in FIG. 2. In some embodiments, communication interface 301 may be integrated into dialogue management device 122. In some embodiments, the communication interface 301 may be integrated into or associated with another device of the system 100, such as, for example, the API gateway 110, the local network 114, the web server 130, the API server 126, or the NLP server. In accordance with certain example implementations of the disclosed technology, (and as will be discussed further with reference to FIG. 4) the communication interface 301 may be configured to send "contact card" information (in the form of a SMS message, for example) to the user device 102 upon authentication and enrollment in the SMS account servicing. For example, the "contact card" information may provide a convenient way for the user device 102 to receive and store (for example, in the user's contacts) the SMS number associated with the intelligent assistant system.

As discussed with respect to FIGS. 1-3, the system 100 may enable automating natural language dialogue with a customer by utilizing the structure provided by the event queue 260, dialogue management device 122, command queue 270, API server 126, NLP server 124, and communication interface 301 to adaptively respond to customer messages. Certain example implementations of the disclosed technology may leverage artificial intelligence in the machine learning models and natural language processing device to adaptively respond to customer communications using natural language. In certain example implementations, the use of a repeatedly updating customer context and information may enable the system 100 to generate and provide customized responses to individual customers and adapt the responses over time. By utilizing artificial intelligence and machine-learning by the NLP device 124, and a by repeatedly updating customer context/information maintained by the dialogue management device 122, the system may enable the non-deterministic, adaptive, and customized conversational responses to customer dialogue messages. Further, according to some embodiments, the system 100 may enable asynchronous processing of events and creation of commands by the dialogue management device 122. Further, while FIG. 3 and the related description appear to show a particular single cycle of events, it should be appreciated that multiple different cycles of events may be processed in parallel by the dialogue management device 122.

In some embodiments, the trained machine learning model 295 (as discussed with reference to FIG. 2) may include a people model that serves to estimate a customer's mindset per use case, and over time. For example, the people model may estimate how stressed out a customer is and determine, for example, how fast they want to conduct a transaction or interaction. The trained machine learning model 295 may include, for example, a relevance measure that may quantitatively assess how relevant a particular conversion with a customer is based on the percent of task completion and rate of return conversations. The trained machine learning model 295 may include an affect recognition functionality that seeks to recognize a customer's emotions based on facial expressions, audio speech signals, images, gestures, blood pressure, heart rate, or other such customer data that may be collected by a user device 102 and transmitted to the system 100. In some embodiments, the trained machine learning model 295 may include payment and financial planning features that model risk factors, savings, and spending patterns over time. In some embodiments, the trained machine learning module 295 may include observations of the accuracy and effectiveness of the automated natural language interactions by tracking business metrics over time, such as for example, a reduction in call center volume over a period of time. In some embodiments, the trained machine learning module 295 may enable the execution of hypothesis-driven micro-experiments that enable the system to test a model hypothesis on a small population of users to validate whether the hypotheses are valid or not.

In some embodiments, the system 100 architecture may allow the API server 126, the NLP device 124, and the communication interface 301 to operate independently from one another by separately pulling commands from command queue 270. In certain example implementations, the system 100 may provide the advantage of asynchronous operations. Accordingly, the entire system may be stateless, with no side effects to calling a particular function.

FIG. 4 is an example system functionality diagram of a process 400 for controlling enrollment and secure persistent account servicing communications via SMS texting. In accordance with certain example implementations of the disclosed technology, the process 400 may be executed using the dialogue management device 122 in concert with one or more of the system 100 components (discussed with respect to FIGS. 1-3) to map user generated text to specific account servicing functions, including retrieval of account information, transactions, and status, and account servicing actions, including transactions, transfers, updates, and preferences. According to an example implementation of the disclosed technology, the dialogue management device 122 of the system 100 manages the dialogue state and the interaction with the user to accomplish the account servicing intent by interpreting the account context and using one or more rounds of dialogue to solicit addition information from the user and to disambiguate the account servicing intent. In an example implementation, the system 100 then uses the natural language processing device 124 to produce the text response to the users account servicing request, which is delivered via SMS text. Accordingly, the access to account servicing functions via the system 100 may be determined by one or more components 110-130 of the system 100 for controlling enrollment and secure persistent SMS texting account servicing communications.

The process 400 may enable customers to access account information and/or perform account servicing functions by texting with the intelligent assistant without having to login to a website or mobile app every time. Certain example implementations of the disclosed technology may provide an improved experience for a customer, by enabling account servicing through digital self-service channels without the friction of a customer having to navigate to a website or mobile app and/or provide login credentials each time the customer interacts with the system 100. The example implementations may provide functionality that enables a customer to select an identifier of the intelligent assistant from a listing of contacts, or from a recent conversation etc., and initiate account servicing dialogue with the intelligent assistant via SMS, just as the customer may initiate an SMS dialogue with any other contact.

According to an example implementation of the disclosed technology, and as depicted in block 402, the process 400 may utilize website enrollment (and/or enrollment through a mobile app), in which customers may authorize (and/or be authorized) to establish persistent secure access to account servicing via SMS text based on an initial (one-time) login and authorization process. In certain example implementations of the disclosed technology, a customer may perform the initial login in to the website or mobile app by supplying authentication credentials (such as a code, two-factor authorization, biometric information, etc.). Once authenticated, a customer may be granted persistent SMS access by providing additional information, including (but not limited to)

their mobile phone number, consent to communicate with the account provider via SMS text, and consent to service their account via SMS text. As discussed above with reference to FIG. 1, and according to certain example implementations, once authorized and enrolled via the website enrollment, a revocable token associated with the user's account may be generated and stored in the enrollment token store 118. Additional details regarding the revocable token will be discussed below with respect to the method flow diagram of FIG. 5. As discussed above with reference to FIG. 3, and according to certain example implementations, once authorized and enrolled via the website enrollment, a "contact card" (or similar identifying information) may be sent the user's mobile device as a convenient way for the user to add a contact entry to their mobile device for SMS messaging communications with the intelligent assistant system 100.

In block 404, a message, such as a SMS text, from a customer and originating from a mobile device, such as user device 102 as shown in FIG. 1, may be received by the system 100. In accordance with certain example implementations of the disclosed technology, SMS messaging interactions between the user device 102 and the system 100 may commence at any point in time (i.e., days or weeks) after the website enrollment process (barring a timeout or revocation of a token) and may span over a plurality of interactions. In certain instances, the interactions can be intermittent. Accordingly, once authenticated and enrolled, all the customer needs to do is open their traditional SMS messaging app to interact with the intelligent assistant system 100, for example, in the same way they communicate via SMS messages to friends. In block 406, a phone number of mobile device may be extracted from the received message and utilized to determine whether the customer account associated with the phone number is authorized to utilize the account servicing via SMS texting. This step may be performed by the phone number authentication module 116 of FIG. 1. In some examples, phone number authentication module 116 may attempt to retrieve data from the phone number store, such as phone number data store 120 of FIG. 1 (as shown in block 410).

In accordance with certain example implementations of the disclosed technology, if the phone number extracted from the message does not match with any currently stored phone numbers in the phone number data store 120, the phone number authentication step 406 may direct the customer back to the website enrollment 402 for authentication, as discussed above. As depicted in block 408, if the phone number extracted from the message matches with a currently stored phone number in the phone number data store 120, the phone number authentication step may check if there is an active (revocable) token in the enrollment token store 118 that authorizes the customer's interaction with the intelligent assistant via SMS text. If the token associated with the phone number does not exist, or if it has been revoked, the phone number authentication step 406 may direct the customer back to the website enrollment 402 to generate or renew the token. In accordance with certain example implementations of the disclosed technology, the system 100 may allow SMS account servicing on the conditions that: (1) the phone number extracted from the incoming message matches with a phone number in the phone number data store 120; and that (2) an active, authorized token associated with the phone number exists in the enrollment token store 118. In certain example implementations, the token may be checked per block 408 before the phone number is checked per block 410.

In accordance with certain example implementations of the disclosed technology, and as depicted in block 424, the SMS enrollment token may be revoked when any of the following occurs: the customer changes their mobile number; the customer revokes consent to communicate via SMS text (for example, by texting "STOP" to the system 100); the customer revokes consent to service their account via SMS text (for example, by texting "UNENROLL" to the system 100, which may be interpreted by the natural language processor as intent to revoke consent); and/or the customer's mobile number appears on a list of mobile numbers that have switched carriers. In accordance with certain example implementations of the disclosed technology, a mobile number that has been assigned to a new carrier may be detected by an automated process that checks the customer's mobile number against a mobile number feed provided by wireless carriers. In certain example implementations, the system 100 may utilize a third-party service to verify a customer's phone number change by a carrier (or between carriers) for continuity with other customer information (such as an address), for example, to avoid token revocation when the customer changes their phone number. As depicted by block 426, the SMS enrollment token may expire (or be revoked) if the customer does not service their account via SMS text for a pre-determined number of days (such as 60 days, 120 days, or any period determined by the account provider). Accordingly, the system 100 may keep track of the last time the account has been accessed by SMS messaging. In accordance with certain example implementations of the disclosed technology, the revocable token may include a predefined expiration period. Provided that the SMS enrollment token has not been revoked or expired, the system 100 may allow the customer persistent access to the intelligent assistant for account servicing over multiple texting sessions without having to re-enroll or authenticate via the website or mobile application.

As depicted in block 414, once a phone number and token associated with an incoming SMS text message has been authenticated, the system 100 may proceed with a SMS chat session, allowing the customer to interact with the system 100 for various account servicing functions. Responsive to a received SMS message, system 100 may generate one or more SMS response dialogue messages that may be transmitted for display at a user device 102. According to an example implementation of the disclosed technology, the chat session 414 may utilize customer context 416 and natural language processing 418 to produce dialogue 420 for SMS communication with mobile device associated with the authorized phone number. In certain example implementations, the chat session 414, customer context 416, natural language processing 418, and/or the generated dialogue 420 may be processed by the dialogue management device 122 and/or the associated components as discussed above with reference to FIGS. 1-3.

As depicted in block 422, (and as discussed above with respect to the enrollment token in block 408) a customer may terminate persistent authentication for interaction with the intelligent assistant, for example, by revoking consent to communicate and/or service their account via SMS text. In certain example implementations, after a mobile terminated intelligent assistant response 422 is received (or for any revocation of the token or lack of a match of the phone number), subsequent SMS messages received by the system may result in a "stock" message being delivered back to the originating mobile device to direct the customer back to the enrollment process as discussed above with reference to block 402.

Figure 5:
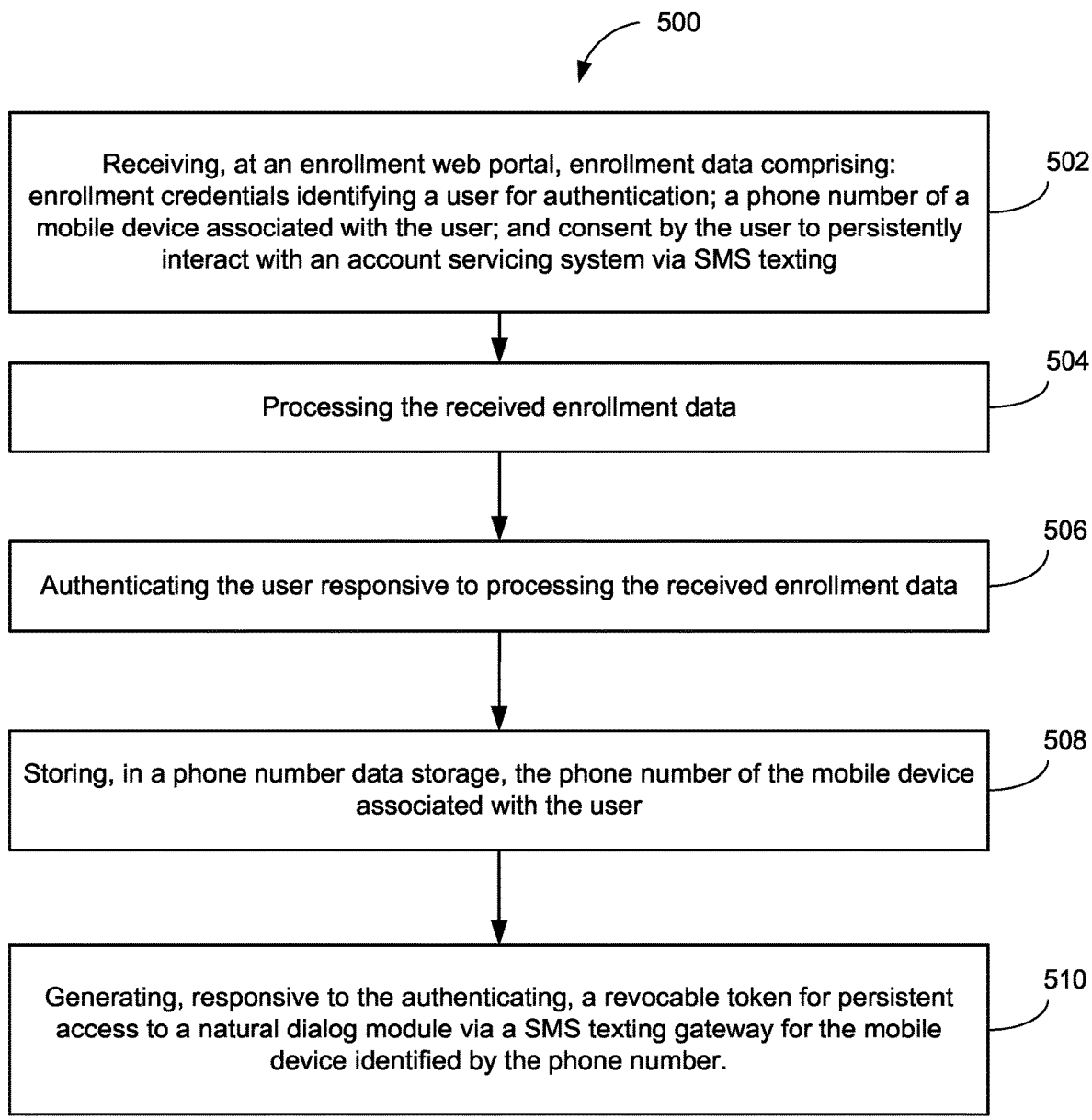
FIG. 5 is a flowchart of a method 500 for enrollment and secure persistent SMS texting account servicing communications.

FIG. 5 is a flowchart of a method 500 for enrollment and secure persistent SMS texting account servicing communications. In certain example implementations, one or more of the steps of the method 500 may be performed by dialogue management device 122 using processor 210 to execute memory 230. In some embodiments, steps of method 500 may be delegated to other components, such as the user device 102, and/or components associated with the system 100. Following method 500, the system 100 may generate a response dialogue message that may be transmitted for display at, for example, user device 102.

In block 502, the method 500 includes receiving, at an enrollment web portal, enrollment data comprising: enrollment credentials identifying a user for authentication; a phone number of a mobile device associated with the user; and consent by the user to persistently interact with an account servicing system via SMS texting. In block 504, the method 500 includes processing the received enrollment data. In block 506, the method 500 includes authenticating the user responsive to processing the received enrollment data. In block 508, the method includes storing, in a phone number data storage, the phone number of the mobile device associated with the user. In block 510, the method 500 includes generating, responsive to the authenticating, a revocable token for persistent access to a natural dialog module via a SMS texting gateway for the mobile device identified by the phone number.

Certain example implementations of the disclosed technology can include initiating a persistent SMS texting session with the mobile device identified by the phone number and based on the revocable token.

In an example implementation, the persistent SMS texting session may be initiated responsive to a match of the phone number stored in the phone number data storage.

Certain example implementations may include revoking the token to stop access to the natural dialogue module via the SMS texting gateway by the mobile device identified by the phone number responsive to one or more of: a detected change in the phone number, revocation of consent by the user, a "STOP" or "UNENROLL" (or similar) text message received from the mobile device, a disconnect indication received from a carrier associated with the phone number, and a predetermined period of inactivity.

Certain example implementations can include retrieving and interpreting user generated text based on context associated with the user. Certain example implementations can include generating response dialogue text based on the interpreted user generated text and context associated with the user. In certain example implementations, the context may be derived from user information stored in a database, the user information can include one or more of: account types, account statuses, transaction history, conversation history, people models, an estimate of customer sentiment, customer goals, and customer social media information.

Certain example implementations of the disclosed technology can include determining a meaning of the user generated text by utilizing one or more of the following artificial intelligence techniques: intent classification, named entity recognition, sentiment analysis, relation extraction, semantic role labeling, question analysis, rule extraction and discovery, and story understanding.

In an example implementation, the response dialogue text may be generated by utilizing one or more of the following artificial intelligence techniques: content determination, discourse structuring, referring expression generation, lexicalization, linguistic realization, explanation generation.

Certain example implementations can include revoking the token to stop access to the natural dialogue module via the SMS texting gateway by the mobile device identified by the phone number responsive to receiving, at the enrollment web portal, one or more of: a change to the phone number, and a revoked consent to communicate with the account provider via SMS text.

Certain example implementations of the disclosed technology include a system having one or more processors configured to initiate, responsive to the authentication, a persistent SMS texting session with the mobile device identified by the phone number. In an example implementation, the persistent SMS texting session is initiated responsive to: a verification of an active token associated with the enrollment data; and a match of the phone number stored in the phone number data storage. The one or more processors are further configured to retrieve account context for the user identified by the phone number responsive to the authentication.

In certain example implementations, the one or more processors are further configured to revoke the token to stop access to the natural dialogue module via the SMS texting gateway by the mobile device identified by the phone number responsive to one or more of: a detected change in the phone number, revocation of consent by the user, a "STOP" or "UNENROLL" (or similar) text message received from the mobile device, a disconnect indication received from a carrier associated with the phone number, and a predetermined period of inactivity.

In an example implementation, the system can include a natural language dialogue module that can include a trained machine learning dialogue management device configured to retrieve and interpret user generated text based on context associated with the user. In certain example implementations, the dialogue management device may be further configured to generate response dialogue text based on the interpreted user generated text and context associated with the user.

In certain example implementations, the one or more processors are further configured to revoke the token to stop access to the natural dialogue module via the SMS texting gateway by the mobile device identified by the phone number responsive to receiving, at the enrollment web portal, a change to the phone number.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Use Case Examples

The following example use cases are intended solely for explanatory purposes, without limiting the scope of the disclosed technology.

In an example use case, a customer may have a question or request associated with an account they have with an organization. For example, the customer may want to know information related their account, such as the account balance, due date for payment, specifics about a purchase, etc. In some instances, the customer may want to perform an action related to their account, such as making a payment, dispute a charge, etc. In these use cases, the customer may further wish to have a convenient and efficient way to pose their question or request account service without having to deal with the waiting times, inefficiencies and complexities that are often associated with customer service interactions involving call centers or interactive voice response systems. In this use case, the customer may prefer using text-based messaging as a preferred form of communication for posing questions or requesting service associated with their account.

To allow access to the system using SMS texting interactions, the customer will login in to the website or mobile app associated with the organization by supplying authentication credentials (such as a code, two-factor authorization, biometric information, etc.). Once authenticated, the customer may be granted persistent SMS access by providing additional information, including (but not limited to) their mobile phone number, consent to communicate with the organization via SMS text, and consent to service their account via SMS text. Once properly authenticated, the customer may then use their mobile device to access account information and/or perform account servicing functions by texting with the intelligent assistant without having to login to a website or mobile app every session. This process may provide an improved experience for a customer, by enabling account servicing through digital self-service channels without the friction of a customer having to navigate to a website or mobile app and/or provide login credentials each time there is an interaction with the system.

In this (and other) use cases, the disclosed technology provides a secure and persistent authentication process for accessing account servicing functions via SMS texting by utilizing a revocable token, which may be utilized to secure and protect access to sensitive information. For example, the customer's mobile phone number and the consent to communicate with the organization via SMS text may be persisted in a data store, which can only be changed while the customer is logged in. In certain example implementations, the revocable token may be based on the association of the customer's mobile phone number with their digital profile identification. In an example implementation, each time a customer interacts with the intelligent assistant via SMS text, the system checks the data store to verify that the customer still has the same mobile phone number and has not revoked consent to communicate via SMS text. The token is also checked to see if it is still valid. If the token has expired, customers must log in to the website or mobile app again to re-establish the persistent authentication token for account servicing via SMS text.

In accordance with certain example implementations of the disclosed technology, the token may expire when any of the following occurs: the customer changes their mobile number; the customer revokes consent to communicate via SMS text; the customer revokes consent to service their account via SMS text; the customer does not service their account via SMS text for a pre-determined number of days; and/or the customer's mobile number appears on a list of mobile numbers that have switched carriers.

In another example use case, once the customer has performed the initial authentication and consent process via the website or mobile app, the customer may send a text message from their (authorized) mobile device to a number provided by the system (and associated with the organization). For example, the SMS message may be: "Hello, can you please tell me my account balance?" The SMS text message may be received by the system (e.g., via the SMS aggregator 104). The system may first check to see if the mobile device number associated with the SMS message is associated with and account on the system, and to also check if there is a valid token associated with the phone number. If so, the system may proceed to process the message to understand its meaning and determine a response. In the process of making the determination about how to respond, the system may consider the customer context of the user. For example, the system may analyze the currently known data about the customer, such as the customer's account information, previous interactions with the customer, the customer's goals, the customer's social media presence, and an estimation of the customer's emotional state to determine how to respond. In doing so, the system may decide, based on previous requests, that the customer is requesting information about a checking account, and therefore may decide to respond with the customer's checking account information. In another instance, the system may decide that it does not have enough information to determine which account the customer is referring to and may send a SMS message to the customer requesting more information. Further, the system may customize the form of the response.

Another use case involves the system proactively providing a customer with unrequested information via SMS during a customer-initiated session and based on a predictive analysis of the customer's needs. Such predictive analysis can be conducted using machine learning and modeling in conjunction with knowledge of the customer context. For example, a customer may send the system a SMS message requesting a change in automatic bill payments. In addition to making the requested change, the system may send a SMS message to the customer to remind them that they have a bill coming due soon, despite the fact that the customer did not request that information. In this way, the system can take proactive steps to meet a customer's needs.

What is claimed is:

1. A system for secure persistent account servicing communications, the system comprising:
   one or more processors in communication with:
      a communication interface;
      an intelligent assistant system that includes a natural language processing module;
      an information storage database storing a plurality of records associated with a plurality of devices; and
      memory in communication with the one or more processors and storing instructions that, when executed by the one or more processors, are configured to cause the system to:
         receive, at the communication interface, an identifier of a device associated with a user;
         store, in the information storage database, the identifier of the device;
         determine a control event based on the identifier of the device; and
         control access to the system by the device responsive to the control event.

2. The system of claim 1, wherein the control event comprises one or more of:
   a detected change in the identifier of the device;
   a disconnect indication received from a carrier;
   a predetermined period of inactivity; and an indication of an assignment of the identifier of the device to a new carrier.

3. The system of claim 1, wherein the identifier of the device comprises a phone number of the device.

4. The system of claim 1, wherein the plurality of records stored in the information storage database comprise records of account servicing dates associated with a plurality of mobile devices.

5. The system of claim 4, wherein the instructions, when executed by the one or more processors, are further configured to cause the system to determine, based on a record of an account servicing date associated with the identifier of the device, whether a predetermined period of inactivity has elapsed, wherein the device is authenticated for account servicing responsive to a previous authentication of the user and a non-elapsed status of the predetermined period of inactivity.

6. The system of claim 1, wherein the one or more processors are further configured to transmit a response dialogue message in an electronic communication session with the device identified by the identifier.

7. The system of claim 6, wherein the response dialog message comprises one or more of: a chat, an instant messaging, a voice-to-text transcript, an SMS message, or an email.

8. A computer-implemented method, comprising:
receiving, at a communication interface of an intelligent assistant system that includes a natural language processing module, an identifier of a device associated with a user;
storing, in an information storage database, the identifier of the device;
determining a control event based on the identifier of the device; and
controlling access to the system by the device responsive to the control event.

9. The method of claim 8, wherein the control event comprises one or more of:
a detected change in the identifier of the device;
a disconnect indication received from a carrier;
a predetermined period of inactivity; and
an indication of an assignment of the identifier of the device to a new carrier.

10. The method of claim 8, wherein the identifier of the device comprises a phone number of the device.

11. The method of claim 8, wherein the information storage database is configured to store records of account servicing dates associated with a plurality of devices.

12. The method of claim 11, further comprising determining, based on a record of an account servicing date associated with the identifier of the device, whether a predetermined period of inactivity has elapsed, wherein the device is authenticated for account servicing responsive to a previous authentication of the user and a non-elapsed status of the predetermined period of inactivity.

13. The method of claim 8, further comprising transmitting a response dialogue message in an electronic communication session with the device identified by the identifier.

14. The method of claim 13, wherein the response dialog message comprises one or more of: a chat, an instant messaging, a voice-to-text transcript, an SMS message, or an email.

15. A non-transitory computer readable storage medium storing instructions for use with one or more processors in communication with memory that, when executed by the one or more processors, cause the one or more processors to:
receive, via a communication channel, an identifier of a device associated with a user;
store, in an information storage database, the identifier of the device;
determine a control event based on the identifier of the device; and
control access to an intelligent assistant system by the device responsive to the control event.

16. The non-transitory computer readable storage medium of claim 15, wherein the control event comprises one or more of:
a detected change in the identifier of the device;
a disconnect indication received from a carrier;
a predetermined period of inactivity; and
an indication of an assignment of the identifier of the device to a new carrier.

17. The non-transitory computer readable storage medium of claim 15, wherein the identifier of the device comprises a phone number of the device.

18. The non-transitory computer readable storage medium of claim 15, wherein information storage database is configured to store a plurality of records of account servicing dates associated with a plurality of devices.

19. The non-transitory computer readable storage medium of claim 18, wherein the instructions, cause the one or more processors to determine, based on a record of an account servicing date associated with the identifier of the device, whether a predetermined period of inactivity has elapsed, wherein the device is authenticated for account servicing responsive to a previous authentication of the user and a non-elapsed status of the predetermined period of inactivity.

20. The non-transitory computer readable storage medium of claim 15, wherein the one or more processors are further configured to transmit a response dialogue message in an electronic communication session with the device identified by the identifier, wherein the response dialog message comprises one or more of: a chat, an instant messaging, a voice-to-text transcript, an SMS message, or an email.

* * * * *